United States Patent Office 2,856,243
Patented Oct. 14, 1958

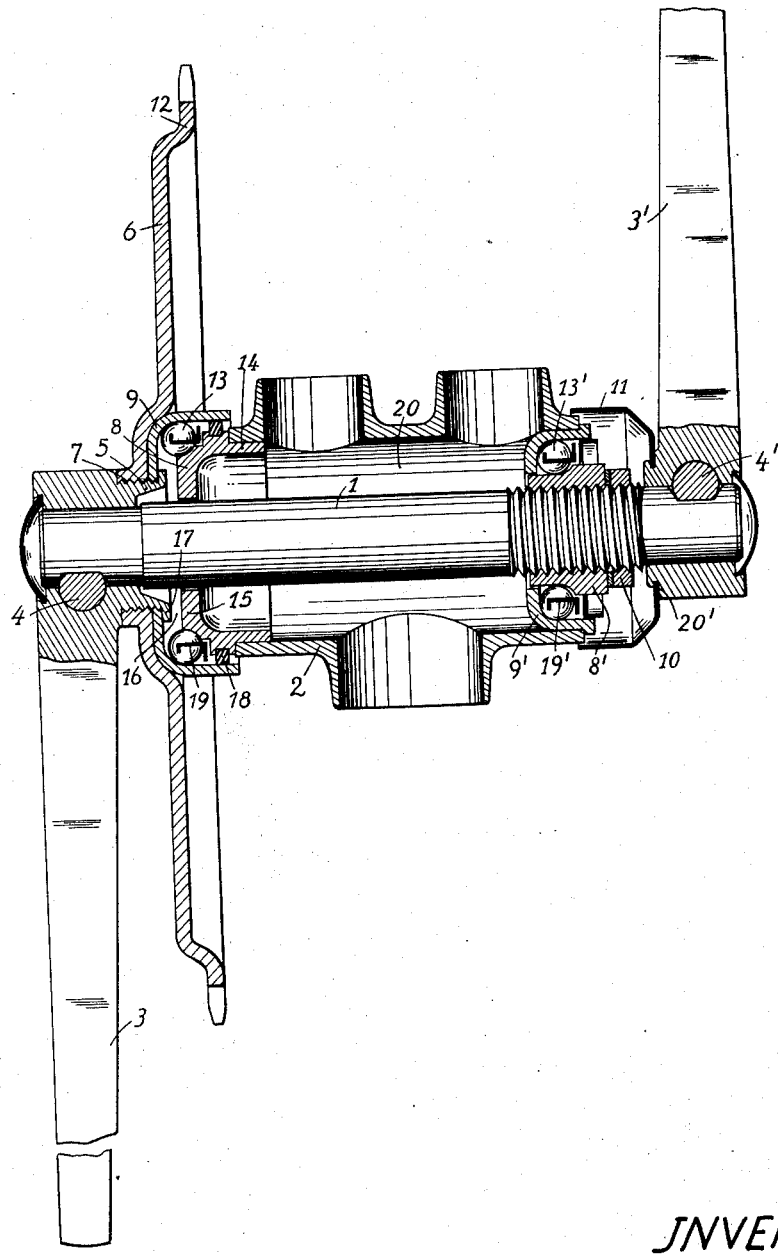

2,856,243

BEARINGS FOR PEDAL CRANK SHAFTS OF PEDAL DRIVEN VEHICLES

Johann Stellwag, Nurnberg, Germany, assignor to Victoria-Werke A. G., Nurnberg, Germany Application May 28, 1956, Serial No. 587,657

Claims priority, application Germany June 3, 1955

3 Claims. (Cl. 308—179.5)

The present invention relates to bearings for the pedal crank shafts of pedal-driven vehicles, particularly, bicycles.

It has been known to mount the pedal crank shaft of bicycles, tricycles or the like, on two ball bearing assemblies housed within the hub forming part of the frame structure of the vehicle, whereby the inner races of these assemblies are secured to the crank shaft, while the outer races are attached to the hub. In such construction, it is unavoidable that a considerable distance is present between the plane of the sprocket wheel or its rim and a plane through the centers of the ball bearing assembly. The force of the chain pull acting on the rim of the sprocket wheel, due to the aforementioned distance, results in an undesirable bending moment about the ball bearing which decreases considerably the life of the ball bearing.

A further disadvantage of this known design is the small diameter of the ball bearing assembly resulting from the mounting of the ball bearing inside the hub of the pedal crank shaft.

It is an object of the present invention to avoid the foregoing disadvantages and to provide a construction of a bearing requiring less parts and being simpler to produce than the known crank shaft bearings, so that the life of the bearing is increased while, simultaneously, its manufacturing costs are reduced.

It is a further object of the invention to provide the ball bearing assembly for the pedal crank shaft at the side of the sprocket wheel in such a manner that the plane through the sprocket wheel or its rim substantially coincides with the plane through the centers of the ball bearing assembly, or is slightly to the inner side between the two ball bearing assemblies, upon which the crank shaft is mounted.

It is another object of this invention to secure the outer race of this ball bearing assembly to the sprocket wheel and provide its inner race on the hub of the crank shaft bearing.

It is a still further object of the present invention to mount the outer race of this ball bearing assembly together with the sprocket wheel on a flange provided on one of the ends of the crank shaft arm. The sprocket wheel and the outer race can be secured against rotation on this flange by means of small interengaging teeth or serrations provided on these parts, whereby a safe joint with respect to axial displacement is obtained by flaring over the protruding outer rim of the flange.

It is an additional object of the invention to secure the inner race of this ball bearing assembly to the bearing hub by press-fitting the inner race in an end of said hub.

As a result of such design, the balls of the ball bearing assembly are located outside of the hub bearing, so that the diameter of the ball assembly is not dependent upon the inner diameter of the hub, whereby it can be advantageously larger. The chamber in which the ball assembly and the lubricating oil or grease are provided is confined by a protruding flange of the inner race, extending close to the shaft and by a seal between the inner and the outer races.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the attached drawing, an example of a pedal crank shaft bearing according to this invention is illustrated in longitudinal section.

The pedal crank shaft bearing comprises a shaft 1, journalled in a hub 2 being a part of the vehicle frame. Crank arms 3 and 3' are secured in the usual manner to the free ends of the shaft 1 by means of keys 4 and 4', respectively. A sprocket wheel 6 is mounted on a flange 5 formed on the side of the end of the crank arm 3 which faces the bearing. Interengaging small teeth or serrations, indicated at 7, provided on the flange 5 and in the opening of the sprocket wheel 6 assure a firm connection between the crank arm 3 and the sprocket wheel 6 against torsional stresses.

In addition, an outer ball race 9 is mounted on the flange 5 on the inner side of the sprocket wheel 6 and is likewise locked in place by means of the interengaging small teeth or serrations at 7, or this race 9 may be made an integral part of the sprocket wheel 6. The rim 17 of the flange 5 is flared over outwardly, thereby assuring a firm and permanent connection between the sprocket wheel 6, the outer race 9 and the crank arm 3. A ball assembly 13, including a cage 19 holding the individual balls together, is placed between the two races 8 and 9. The diameter of this assembly 13 is larger than the diameter of the hub 2, so that there is practically no bending moment due to forces acting on the sprocket wheel 6. Thus, the stress on the ball bearing assembly 13 is reduced. The inner race 8 of the ball bearing is provided with an extension flange 14 inserted press-fit into the hub 2. An annular flange 15 of this inner race 8 extends close to the shaft 1, practically closing the chamber 16, containing lubricant for the ball bearing, toward the interior chamber 20 of the hub.

A sealing ring 18 is provided between the inner race 8 and the outer race 9 to prevent dust from entering the ball bearing assembly 13.

The ball bearing assembly 13', at the side of the crank arm 3', may be of conventional construction comprising an inner race 8' threaded on shaft 1 and secured in place by means of a lock nut 10. An outer race 9' is press-fit in the hub 2. The arrangement of this ball bearing assembly 13' shows the necessity to make the diameter of the assembly smaller than the diameter of the hub 2. A cage 19' is provided to hold the individual balls of this assembly 13' together. A protective cap or guard 11 is provided on this side of the bearing to prevent dirt or dust from entering the ball bearing assembly 13'. The cap 11 is mounted on a flange 20' at the side of the end of crank arm 3' facing the bearing assembly 13'. Such cap is omitted at the other side of the bearing, because there the outer race 9 acts simultaneously as dust guard.

I claim:
1. In a pedal driven vehicle or the like, a vehicle frame structure including a pedal crank shaft hub, a pair of laterally spaced ball bearing assemblies associated with said hub, a pedal crank shaft extending through said assemblies, oppositely directed pedal crank arms mounted on the outer ends of said crank shaft, a sprocket wheel at one of said crank shaft ends, an in- wardly extending flange formed on one of said crank shafts for securing said sprocket wheel thereon, one of said ball bearing assemblies being substantially in the plane of said sprocket wheel, said ball bearing assembly having outer and inner ball races, said outer ball race being mounted on said flange and said inner race on said hub.

2. The mounting of the sprocket wheel and outer ball race, as claimed in claim 1, further characterized by having interengaging teeth or serrations between said flange, said sprocket wheel and said outer ball race to prevent rotary movement of said wheel and said race on said flange, and by having on the outer end of said flange an enlarged rim portion to prevent disassembling due to longitudinal displacement of said wheel and said race on said flange.

3. A pedal driven vehicle in accordance with claim 1, wherein said inner ball race has a radial flange extending inwardly close to said shaft.

References Cited in the file of this patent

UNITED STATES PATENTS

| | | |
|---|---|---|
| 530,103 | Grueter et al. | Dec. 4, 1894 |
| 581,395 | Hawes | Apr. 27, 1897 |
| 611,137 | Morrison | Sept. 20, 1898 |
| 689,795 | Copeland | Dec. 24, 1901 |
| 1,268,351 | Hogue | June 4, 1918 |